US008175639B2

(12) United States Patent
Amirmokri

(10) Patent No.: US 8,175,639 B2
(45) Date of Patent: May 8, 2012

(54) NANOPC MOBILE PERSONAL COMPUTING AND COMMUNICATION DEVICE

(76) Inventor: Nasrin Chaparian Amirmokri, Germantown, MD (US)

(*) Notice: Subject to any disclaimer, the term of this patent is extended or adjusted under 35 U.S.C. 154(b) by 618 days.

(21) Appl. No.: 12/323,436

(22) Filed: Nov. 25, 2008

(65) Prior Publication Data

US 2009/0137275 A1 May 28, 2009

Related U.S. Application Data

(60) Provisional application No. 60/990,206, filed on Nov. 26, 2007.

(51) Int. Cl.
*H04M 1/00* (2006.01)
(52) U.S. Cl. ........................ 455/556.1; 704/275; 353/119
(58) Field of Classification Search ........................ None
See application file for complete search history.

(56) References Cited

U.S. PATENT DOCUMENTS

| 6,701,161 | B1* | 3/2004 | Wendling | 455/556.1 |
|---|---|---|---|---|
| 6,804,532 | B1* | 10/2004 | Moon et al. | 455/552.1 |
| 7,896,499 | B2* | 3/2011 | Noba | 353/28 |
| 7,908,303 | B2* | 3/2011 | Fein et al. | 725/100 |
| 2003/0117368 | A1* | 6/2003 | Pedersen | 345/156 |
| 2006/0119582 | A1* | 6/2006 | Ng et al. | 345/168 |
| 2007/0030455 | A1* | 2/2007 | Inoue | 353/15 |
| 2007/0245223 | A1* | 10/2007 | Siedzik et al. | 715/500.1 |
| 2007/0249396 | A1* | 10/2007 | Nitta et al. | 455/556.1 |
| 2008/0058009 | A1* | 3/2008 | Ko et al. | 455/556.1 |
| 2008/0161038 | A1* | 7/2008 | Lin et al. | 455/552.1 |
| 2011/0153323 | A1* | 6/2011 | Kim et al. | 704/235 |

FOREIGN PATENT DOCUMENTS

WO WO 2007011123 A1 * 1/2007
WO WO 2007029805 A1 * 3/2007

OTHER PUBLICATIONS

Microvision Inc., PicoProjection Displays-Embedded Projector, downloaded from internet Jan. 3, 2012 at http://www.microvision.com; file creation date via document properties—Jul. 10, 2007.*

* cited by examiner

*Primary Examiner* — Howard Williams
(74) *Attorney, Agent, or Firm* — John R. Kasha; Kasha Law LLC

(57) ABSTRACT

It is the main object of this invention to provide a ubiquitous and multi-functional low power handheld mobile personal computing device which will function as a computing device the size of a PDA with large 17 inches or larger projection screen supporting various wireless local or WAN broadband communication links for data communication means such as Internet browsing, email access, file transfer, downloading, gaming, streaming, and VoIP applications. It will also function as a Portable Media Player for video and audio playback applications displaying a large, high resolution focus free and resizable projection image on any flat surface. Additionally it will function as a Mobile phone providing all of the voice communication functionalities of 3G and 4G mobile telephony systems.

25 Claims, 3 Drawing Sheets

Inside Cover Unfolded

Outside Cover Unfolded

Foot

Inside Cover Folded

Folds

Outside Cover Folded

NANOPC MOBILE PERSONAL COMPUTING AND COMMUNICATION DEVICE

PRIORITY

This application claims priority of provisional application No. 60/990,206 filed on Nov. 26, 2007.

FIELD of INVENTION

This invention in general is in the field of computing, Internet accessing, communications, mobile phone, and entertainment devices, particularly it is related to the mobile devices such as Laptops, Tablet PCs, PDAs, SmartPhones, PocketPCs, Cell or mobile Phones, MP3 players and Portable Media players.

BACKGROUND

This invention relates to handheld mobile personal computing, Internet accessing, communications and entertainment devices, specifically to Laptops, Tablet PCs, PDAs, Smartphones, PocketPCs, MP3 players (e.g. iPod), Portable Media Players and mobile phones. The current mobile personal computing devices mentioned have either standard size screens (typically 14 to 17 inches, offering high screen resolutions), such as Laptop, or Tablet PCs, or small screens (typically 3 to 4 inches, offering only low screen resolutions) such as PDAs, PocketPCs, SmartPhones, MP3 players and Portable Media Players. The first category, Laptop, or Tablet PCs tend to be large, power hungry and bulky (typically 16 to 18 inches in length, 8 to 10 inches in width). They offer most common high screen resolutions such as VGA (640×480), SVGA (800×600), and XGA (1024×768). The smaller computing devices such as PDAs, Smartphones, and PocketPCs although are small and easy to carry (typically 2.7 to 3.0 inches in width and 4.5 to 5.0 inches in length), yet they lack the standard screen size and only offer small screens with low resolutions such as 160×160 to 320×240 (QVGA), which pose limitations for performing typical computing tasks such as word processing, web browsing, email accessing and so on. They are generally incompatible with most Personal Computer (PC) applications and Internet Web pages, which are designed for standard size screens (14 inches and larger), and thus present real limitations to the users. Similarly the entertainment devices such as MP3 and Portable Media Players (e.g. iPod) due to their small and low resolution screens pose limitations for tasks such as video playback and hence offer limited use.

SUMMARY

In order to overcome the aforementioned limitations, this invention an apparatus called NanoPC device will offer large screen size (17 inches or larger) by a small physical size device similar to a PDA size, as well as the best features of the current mobile devices mentioned above such as light weight and low power. This is accomplished by incorporating an embedded or coupled miniature projector into the NanoPC device capable of supporting large screen sizes (17 inches or larger), while keeping the physical size and weight of the apparatus small and its power usage relatively low as compared to a Laptop. The NanoPC, a low power and small form factor computing and entertainment device the size of PDA will be able to perform most of Laptop's (i.e. PC's) applications such as word processing, spread sheet, power point, PDF, Internet browsing, email accessing, file transfer, FTP, streaming, gaming, downloading and etc.

It will also function as a 3G or the upcoming 4G mobile telephony system supporting among others quad-band (e.g. 800, 900, 1800, 1900 MHZ), Global System for Mobile communications (GSM), Universal Mobile Telecommunications System (UMTS), UMTS Long Term Evolution (LTE) and Wideband CDMA (W-CDMA), as well as High-Speed Downlink Packet Access (HSDPA), High-Speed Uplink Packet Access (HSUPA), General Packet Radio Service (GPRS), and Enhanced Data rates for GSM Evolution (EDGE) standards. The NanoPC is also adaptable to support all future mobile telephony systems.

Additionally the NanoPC will function as an entertainment device using its video/audio decompression sub-system (supporting formats such as JPEG, MPEG-2, MPEG-4, H.263, WMV, MP3, WMA, MP4, M4A and many others) for ubiquitous and high resolution playback of respective pictures, movies, video and audio files. It will also provide the capability to take and record pictures, movies, video and audio using its picture/video camera and sound (microphone and etc.) sub-systems and compress them into images (e.g. JPEG), video and audio files (MPEG-2, MPEG-4, H.263, WMV, MP3, WMA, MP4, M4A and other compression formats) for transmission over its communication links to other parties and or storing them on its memory sub-system (e.g. Micro Hard Drive, or Flash memory). Furthermore the NanoPC will support video telephony services using the aforementioned video, audio, receive and transmit sub-systems.

Furthermore, the NanoPC device is capable of receiving and transmitting broadband data using wireless local networks such as WiFi, Bluetooth, Wireless-USB and UWB (Ultra Wide Band), or Wide Area Networks (WAN) using wireless networks such as WiMax, WiBro, 1x-EVDO, and Satellite communication links. The Satellite interface will support but not limited to DVB-S, DVB-S2, DVB-RCS, IPOS, DOCSIS and other protocols. Furthermore the NanoPC will be capable of providing a second means for voice communications through its support of Voice over IP (VoIP) services.

Additionally NanoPC will provide a unique feature which allows users via its Touch screen (3 to 4 inches diagonally) take notes. NanoPC using its special NoteCreation software module will format and store the small notes (3 to 4 inches) into a stranded size page (e.g. 8.5×11", A4, legal, 11×17", and etc.) for viewing and printing, thereby allowing the NanoPC to be used as a virtual electronic notebook.

DETAILED DESCRIPTION

Figure 1:
FIG. 1 depicts an example of the NanoPC Mobile Personal Computing Device.

FIG. 1 shows an example of the NanoPC Mobile Personal Computing Device. This device as seen in the figure can be handheld and project an image generated by an application on a flat surface. A flat surface can be a regular wall, a viewing screen, or any other flat surface. The NanoPC can project the generated images on horizontal or vertical surfaces, depending on the users' preferences.

Figure 2:
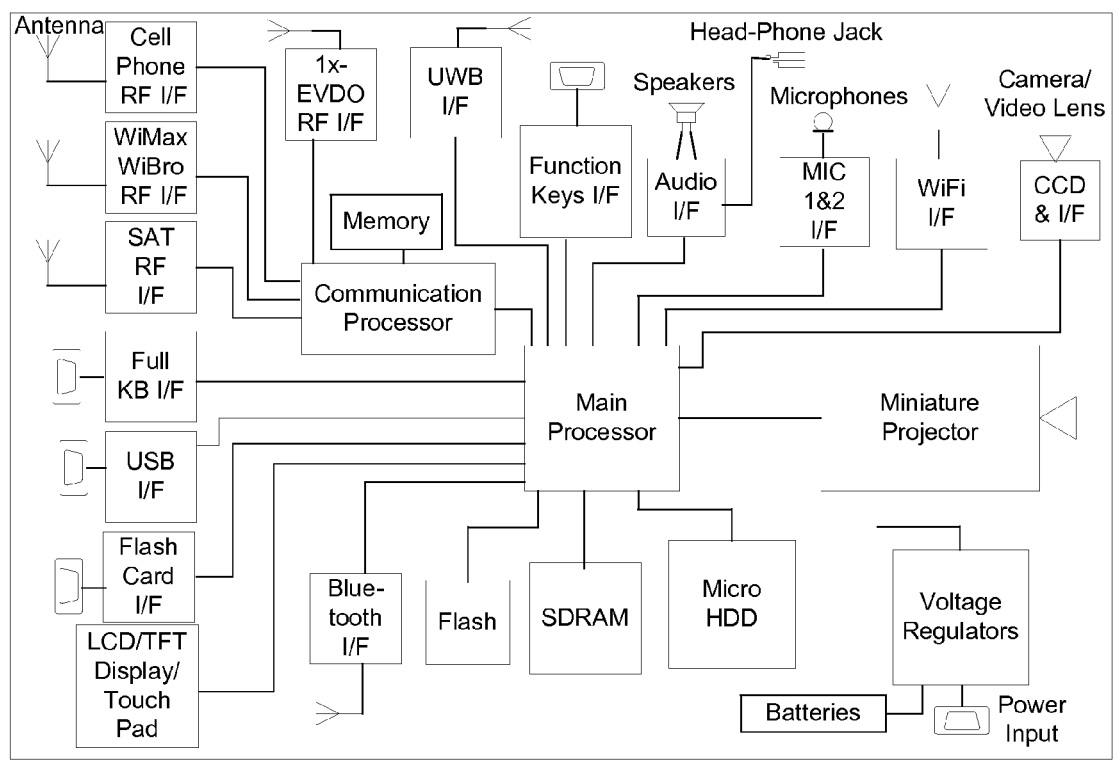
FIG. 2 depicts the NanoPC's major hardware components.
Figure 3B:
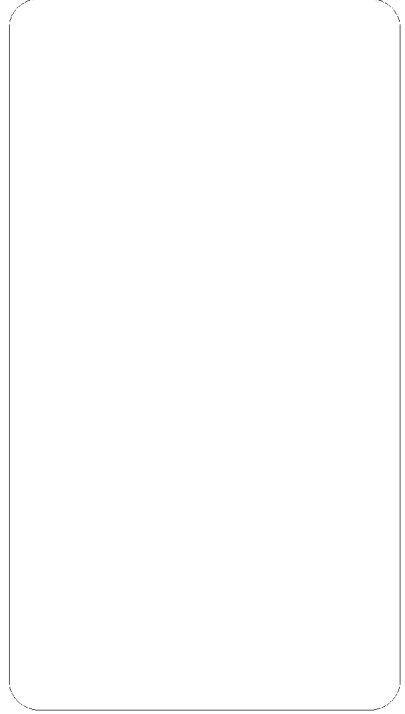
FIGS. 3a-3b depict an inside cover of a NanoPC folded and unfolded, respectively.
Figure 4B:
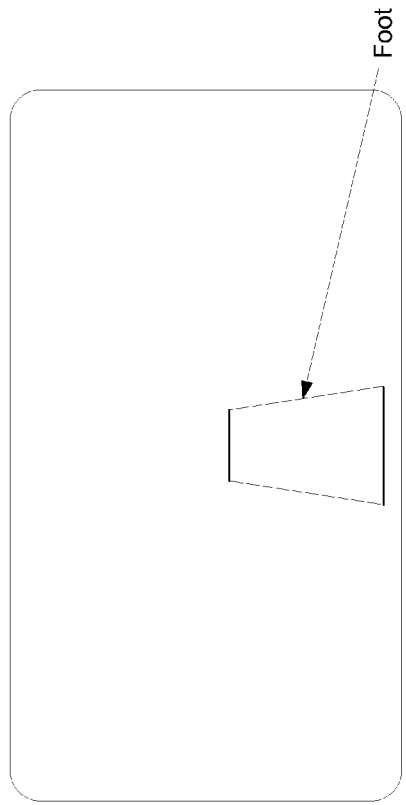
FIGS. 4a-4b depict an outside cover of a NanoPC folded and unfolded, respectively, including a foot to support the unfolded cover in the vertical position.
Figure 3A:
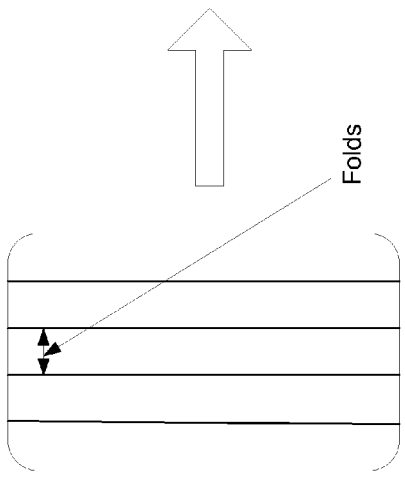
Figure 4A:
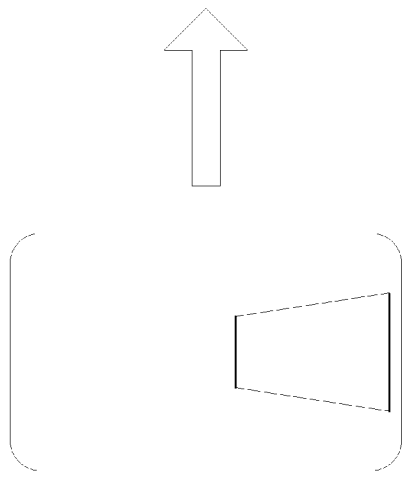

FIG. 2 shows the NanoPC's major hardware components. The core of the apparatus is the Main Processor as a computing engine performing all computational, communication, control and power management functions required by one or more of the various application programs running on the device. The Main Processor also interfaces and controls the memory sub-system (internal and external Flash, SDRAM and Micro Hard Drive) and peripherals such as Miniature Projector Displays, coupled WiFi (e.g. 802.11b, 802.11g, 802.11n and etc. with security such as WiFi Protected Access (WPA and WPA2), Wired Equivalent Privacy (WEP) and others), Bluetooth, Wireless-USB, UWB interfaces, Audio block (speakers and microphones), dedicated keys, keyboard, LCD and Touchpad screen, etc. The Main Processor also performs ongoing power management and control algorithms to maintain low power consumption of the various blocks and as a whole the device while idle or running its various applications.

Additionally a Communication Processor(s) and its dedicated memory will provide the required processing and interfaces either in form of hardware blocks or Software Defined Radio (SDR) to Receiver Front End block(s) (e.g. Radio Frequency (RF), filters, Mixer, Down Converter, Automatic Gain Control (AGC), Intermediate Frequency (IF), antenna and other hardware sections) for pre-processing (e.g. Demodulation, Forward Error Correction and etc.) for the received data, and Transmit Back End block(s) (e.g. RF, filters, Mixer, Up Converter, AGC, IF, antenna and other hardware sections) for post-processing (e.g. modulation, Error Coding and etc.) for transmitted data for its various networks, such as coupled WiMax, WiBro, 1x-EVDO, Satellite, with support for various cryptographic schemes by using one or more of data encryption standards such as Data Encryption Standard (DES), Triple DES, and Advanced Encryption Standard (AES) and others, as well as for the coupled Mobile telephony standards (e.g. GSM, UMTS, UMTS LTE, W-CDMA, HSDPA, HSUPA, GPRS and EDGE) for mobile telephony systems. Each of the wireless interfaces such as WiFi, Bluetooth, Wireless-USB, UWB WiMax, WiBro, 1x-EVDO, Satellite, and Mobile phone could either share or have a unique Receive Front End and Transmit Back End to receive and transmit its data to the antenna.

The memory sub-system consists of internal and external Flash, volatile memory SDRAM (e.g. DDR, DDR2, SDRAM and etc.) and Micro Hard Drive (Micro HDD) for providing sufficient storage space to meet the requirements of the Operating System as well as for storing large data, video, audio and other file formats.

The Miniature Projector is the main display component for the NanoPC which will be capable of projecting (standard or high resolution) focus free images generated by applications running on the device on any flat surface horizontally or vertically. An LCD/TFT Touchpad screen could also be integrated into the NanoPC first as an alternate display screen component and second as a touch pad for inputting data or control.

The NanoPC supports the broadband interfaces including coupled 1x-EVDO, WiMAX, WiBro, Satellite, Bluetooth (BT), WiFi, Wireless-USB, and UWB for data and VoIP communications and Mobile telephony systems (e.g., GSM, UMTS, UMTS LTE, W-CDMA, HSDPA, HSUPA, GPRS and EDGE) for voice and data communications.

The NanoPC will additionally support Global Positioning System (GPS) using its Computing sub-system, Communication processing sub-systems and other blocks.

Additionally the NanoPC will function as an MP3 player or Portable Media player device using its video/audio decompression and video/audio playback (e.g. screens, speakers, headphone jack and etc.) sub-systems supporting formats such as JPEG, MPEG-2, MPEG-4, H.263, WMV, MP3, WMA, MP4, M4A and others for ubiquitous and high resolution playback of pictures, movies, video and audio files. The NanoPC is also capable of taking and recording pictures, movies, video and audio using its picture/video camera and audio subsystems (e.g. lens, CCD, compression engine, mono/stereo microphone(s) and etc.) and compressing them into compressed pictures (e.g. JPEG) or into video and audio files (e.g., as MPEG-2, MPEG-4, H.263, WMV, MP3, WMA, MP4, M4A and other compression formats) using its main processor, which can be transmitted over any of its communication links to other parties and or storing them on its Micro HDD and or on the Flash. The NanoPC will also support video phone applications using the aforementioned sub-systems.

The NanoPC also includes dedicated function keys as well as an interface for using a QWERTY full size keyboard for command and control. Additionally the NanoPC provides software emulation of full QWERTY keyboard using its LCD/TFT touchpad screen which can be used as a full keyboard using a fine tip object such as a stylus pen. A Universal Serial Bus (USB) interface is also provided on the device to facilitate communication with USB enabled devices and support variety of applications. The NanoPC's audio sub-system consists of audio playback section (e.g. one or two speakers and a stereo headphone jack to support headphones, and the required circuitry such as filters, amplifiers and etc.), and audio receive section (e.g. one or two mono/stereo microphone(s), and the required circuitry such as filters, amplifiers and etc.)

Additionally various Smart Memory Cards such as Compact Flash, as an example, can be attached to the device in order to extend the Flash memory space via an auxiliary Flash Card interface. The NanoPC will be a battery operated device with rechargeable battery. It will support an input power connector to allow for recharging its battery or operating the device directly from the input power.

Additionally the NanoPC whether it is operating as a computing, Internet accessing, entertainment or Mobile telephony device upon command by the user will be able to change its output video display dynamically from the large projection screen to its LCD/TFT alternate small screen for any reason (e.g. more privacy) and vice versa, changing its display output from small LCD/TFT screen to large projection screen on the fly. It will therefore be capable of rendering full size screen image such as 17" for example for Internet browsing to small LCD/TFT screen on the fly and vice versa. The user command to change the screen size could be a dedicated key, voice command or a soft command through the keyboard(s).

Additionally the NanoPC will be capable of receiving and recognizing voice commands by the user and performing the requested function(s).

Operation Overview

Operationally the NanoPC as a computing device will use its Computing sub-system (e.g. Main Processor, Memory sub-system, peripheral, and etc.) to perform computing tasks for processing its various applications, such as word processing, spread sheet, power point, PDF and other available Personal Computer (PC) applications, such as for any available gaming. The Main Processor also performs ongoing power management and control algorithms to maintain low power consumption of the various blocks and as a whole the device while idle or running its various applications.

The NanoPC as an Internet device using its Computing sub-system, Communication processing sub-system (e.g. Communication Processor, Receive Front End, Transmit Back End and etc.) and one or more of its coupled wireless network interfaces, such as WiFi, Bluetooth, Wireless-USB, UWB, WiMax, WiBro, 1x-EVDO and Satellite or USB to connect to the Internet to perform browsing, email access, streaming, downloading, FTP, gaming and other tasks.

The NanoPC as a communication device in addition to Internet accessing device described above will interface to the Mobile telephony systems using Computing sub-system, Communication processing sub-systems and other blocks to perform voice communication tasks as a mobile phone, supporting 3G or upcoming 4G Mobile telephony standards such as GSM, UMTS, UMTS LTE, W-CDMA, HSDPA, HSUPA, GPRS and EDGE systems.

The NanoPC as an entertainment device will use its miniature projector as the primary means of displaying the images generated by the application programs running, and will project the focus free images or movies on any flat surface horizontally or vertically from 4 to 17 inches or larger depending on its placement with respect to the viewing surface. In cases where the viewing surfaces are not sufficiently fine to view high quality pictures or movies, NanoPC's unfoldable cover can be used as the viewing screen. The inner surface of the cover will be made to have the properties of a front projection screen having characteristics such as being diffusely reflecting, high gain and etc. to functions as a fine viewing screen once it is unfolded and thus enabling the user to watch high quality images and video. The un-foldable cover area will be at least 10 inches diagonally or larger and will have feet to support it stance in a vertical positions.

The NanoPC will either use the coupled wireless local links such as WiFi, Bluetooth, Wireless-USB, and UWB or the coupled wireless WAN links such as WiMax, WiBro, 1x-EVDO and Satellite to receive and transmit its data for various data communication means such as but not limited to Internet browsing, email access, FTP file transferring, downloading, streaming, VoIP, Gaming and etc. The Mobile telephony interface will provide the main voice communication means as a mobile phone. Furthermore NanoPC's Voice over IP (VoIP) functionality will be used as a second voice communication means via NanoPC's data communication links mentioned above, supporting VoIP protocols such as H.323, SIP, and other protocols. Additionally the VoIP system will be capable of supporting various voice compression/decompression algorithms such as G.729, G.723 and others supporting voice compression rates from 8 kbps to 4 kbps and lower, while supporting various voice Quality of Services (QoS).

The NanoPC will additionally support Global Positioning System (GPS) using its Computing sub-system, Communication processing sub-systems and other blocks.

Additionally the NanoPC will function as an MP3 player or Portable Media player device using its video/audio decompression and audio sub-systems (supporting formats such as JPEG, MPEG-2, MPEG-4, H.263, WMV, MP3, WMA, MP4, M4A and others) for ubiquitous and high resolution playback of pictures, movies, and audio. The NanoPC will also provide the capability to take and record pictures, movies and audio using its picture/video camera and audio sub-systems and compress them into images (e.g., JPEG), and video and audio files (MPEG-2, MPEG-4, H.263, WMV, MP3, WMA, MP4, M4A and other compression formats) for transmission over its communication links to other parties or storage on its Micro HDD and or Flash. The NanoPC will also support video phone applications using the aforementioned sub-systems.

Additionally NanoPC will provide a unique feature whereby users such as students using its Touchpad screen (3 to 4 inches diagonally) can take notes. NanoPC using its special NoteCreation software program will format and store the small notes (3 to 4 inches) taken, into a stranded size page such as 8.5×11", A4, legal, 11×17", and etc. for viewing and printing. Thereby allowing the NanoPC to be used as a virtual electronic notebook.

Additionally the NanoPC whether it is operating as a computing, Internet accessing, entertainment or Mobile telephony device upon command by the user will be able to change its output video display dynamically from the large projection screen to its LCD/TFT alternate small screen for any reason (e.g. more privacy) and vice versa, changing its display output from small LCD/TFT screen to large projection screen on the fly. It will therefore be capable of rendering full size screen image such as 17" for example for Internet browsing to small LCD/TFT screen on the fly and vice versa. The user command to change the screen size could be a dedicated key, voice command or a soft command through the keyboard(s).

Additionally the NanoPC will be capable of receiving and recognizing voice commands by the user and performing the requested function(s).

This invention, the NanoPC is not limited to be used for the aforementioned applications only; it could be adapted to be used for other suitable applications in the field of computing, Internet, communication, and mobile telephony.

The invention claimed is:

1. A mobile computing and communication apparatus comprising:
a small form factor low power computing, Internet accessing, communications and entertainment device, the size of a PDA, having a Miniature Projector to project focus free images generated by one or more of the plurality of the device application programs, on a flat surface vertically or horizontally in various sizes and resolutions, having one or more wireless and wired communication interfaces, and a TFT/LCD Touch screen pad for alternate display use, wherein the device changes its output from the Miniature Projector to the TFT/LCD Touch screen pad based on a voice command.

2. The apparatus according to claim 1, further comprising:
at least one or more of WiFi, Bluetooth, Wireless-USB and UWB communication interfaces coupled to the device are used for one or more of Internet accessing, email access, FTP, file transfer, streaming, downloading, gaming and VoIP applications; and
wherein the WiFi interface supports one or more of 802.11b, 802.11g and 802.11n standards supporting one or more of WPA, WPA2 and WEP security systems.

3. The apparatus according to claim 2, further comprising:
a Main Processor performing all computational, communication, interfacing, control and power management functions required by one or more of the plurality of the device application programs; and
wherein the Main Processor performs the processing of the WiFi, Bluetooth, Wireless-USB and UWB communication interfaces for the received and transmitted data by the respective interface supported by one or more of dedicated hardware Software Defined Radio (SDR) blocks.

4. The apparatus according to claim 3, further comprising:
a memory sub-system consisting of SDRAM, Micro Hard Drive, internal and external Flash to be used by the Main Processor as storage for its various processing and storage needs.

5. The apparatus according to claim 3, further comprising:
a video/audio decompression sub-system for decompressing pictures, video and audio files for one or more of JPEG, MPEG-2, MPEG-4, H.263, WMV, MP3, WMA, MP4, M4A formats for high resolution playback of pictures, movies, video and audio files stored in an internal/external Flash memory, Micro HDD or received via its communication links;
wherein the receiver, video/audio decompression, miniature projector, LCD/TFT screen, audio and speakers sub-systems will support video telephony operations using the apparatus's communication interfaces.

6. The apparatus according to claim 3, further comprising:
a picture/movie camera and audio subsystems for taking and recording pictures, movies, video and audio and compressing them into JPEG image files, video and audio files for one or more of MPEG-2, MPEG-4, H.263 and MP3, WMA, WMV, MP4, M4A compression formats and transmission over its communication links to other parties or storing them on the Micro HDD and internal/external Flash memory;
wherein the picture/movie camera, audio, video, compression and transmission sub-systems will support video telephony operations using the Apparatus's communication interfaces.

7. The apparatus according to claim 1, further comprising:
at least one or more of 1x-EVDO, WiMax, WiBro and Satellite broadband interfaces supporting one or more of data encryption securities, DES, Triple DES, and AES for one or more of Internet accessing, email access, FTP, file transfer, streaming, downloading, gaming and VoIP applications; and
wherein the Satellite interface supports DVB-S, DVB-S2, DVB-RCS, IPOS, and DOCSIS protocols.

8. The apparatus according to claim 7, further comprising:
a Communication Processor(s) and its dedicated memory supporting the wireless communication interfaces for performing both pre-processing and post-processing of received and transmitted data of one or more of the 1x-EVDO, WiMax, WiBro and Satellite interfaces from the Receive Front End block(s) and to the Transmit Back End block(s) respectively; and
wherein the Satellite interface supports DVB-S, DVB-S2, DVB-RCS, IPOS, and DOCSIS protocols: and
wherein the Receive Front End block(s) support one or more of the RF, filters, Mixers, Down Converters, AGC, IF and antenna hardware sections; and
wherein the Transmit Back End block(s) support one or more of the RF, filters, Mixers, Up Converter, AGC, IF and antenna hardware sections; and
wherein the communication interface processing is performed by one of more of dedicated hardware block and Software Defined Radio (SDR).

9. The apparatus according to claim 1, further comprising:
a Quad-band Mobile phone interface for communicating with mobile telephone networks and functioning as a mobile phone, supporting one or more of 3G and the upcoming 4G Mobile Telephony systems supporting one or more of GSM, UMTS, UMTS LTE, W-CDMA, HSDPA, HSUPA, GPRS and EDGE mobile telephony standards.

10. The apparatus according to claim 1, further comprising:
a Voice-over-IP sub-system to support voice communication using VoIP protocols over its data communication links.

11. The apparatus according to claim 1, further comprising:
a GPS interface for communicating with the Global Positioning System for providing locations bases services.

12. The apparatus according to claim 1, further comprising:
a USB interface to communicate with USB enabled devices.

13. The apparatus according to claim 1, wherein the device changes the screen size of the output from the Miniature Projector based on a voice command.

14. The apparatus device according to claim 1, further comprising:
wherein the device is capable of accepting a command from the user to change the video display output image dynamically from a large projection screen to the LCD/TFT alternate small screen or vice versa on the fly.

15. The apparatus according to claim 1, further comprising:
a TFT/LCD Touch screen pad to be used as a touch pad for note taking and other data and control inputting purposes.

16. The apparatus according to claim 1, further comprising:
a NoteCreation software module for formatting the small ¾ inches notes taken via a touch screen into standard screen/page sizes for viewing and printing.

17. The apparatus according to claim 1, further comprising:
one or two microphones for mono and stereo voice reception, recognition and recording.

18. The apparatus according to claim 1, further comprising:
a set of dedicated keys on the device's body for manipulating apparatus's functionalities.

19. The apparatus according to claim 1, further comprising:
an interface for full QWERTY keyboard for full access and control of the apparatus's functionalities.

20. The apparatus according to claim 1, further comprising:
a software emulated full QWERTY keyboard using an LCD/TFT touch screen pad for full access and control of the apparatus's functionalities.

21. The apparatus according to claim 1, further comprising:
wherein the device is capable of receiving and recognizing voice commands by a user and performing requested function(s).

22. The apparatus according to claim 1, further comprising:
an interface to support an external Smart Memory Card for adding Flash memory.

23. The apparatus according to claim 1, further comprising:
one or more speakers to playback output audio and a headphone jack for alternate audio playback.

24. The apparatus according to claim 1, further comprising:
a rechargeable battery providing the main power to the device, wherein it will support an input power connector to allow for recharging the battery or operating the device directly from the input power.

25. A mobile computing and communication apparatus comprising:
- a small form factor low power computing, Internet accessing, communications and entertainment device, the size of a PDA, having a Miniature Projector to project focus free images generated by one or more of the plurality of the device application programs, on a flat surface vertically or horizontally in various sizes and resolutions, having one or more wireless and wired communication interfaces; and
- an un-foldable device cover that unfolds to provide a sufficiently large and fine projection surface for enhanced video and pictures viewing, wherein the un-foldable cover will have feet to support it to stand in a vertical position.

* * * * *